United States Patent
Yamauchi et al.

(10) Patent No.: US 6,898,349 B2
(45) Date of Patent: May 24, 2005

(54) OPTICAL MULTI-DEMULTIPLEXER

(75) Inventors: Junji Yamauchi, Koganei (JP);
Michiya Masuda, Yokohama (JP);
Shigeru Kawaguchi, Yokohama (JP);
Hisamatsu Nakano, Kodaira (JP);
Yuichi Yamamoto, Koganei (JP);
Ryouichi Tazawa, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 221 days.

(21) Appl. No.: 10/132,413

(22) Filed: Apr. 25, 2002

(65) Prior Publication Data

US 2002/0159696 A1 Oct. 31, 2002

(30) Foreign Application Priority Data

Apr. 25, 2001 (JP) ........................................ 2001-128130
Jan. 16, 2002 (JP) ........................................ 2002-007698

(51) Int. Cl.[7] ................................................ G02B 6/34
(52) U.S. Cl. ................................ 385/37; 385/24; 385/43
(58) Field of Search ................................ 385/37, 24, 43

(56) References Cited

U.S. PATENT DOCUMENTS

| 5,745,618 | A | | 4/1998 | Li | |
|---|---|---|---|---|---|
| 5,841,919 | A | * | 11/1998 | Akiba et al. | 385/37 |
| 6,069,990 | A | * | 5/2000 | Okawa et al. | 385/43 |
| 6,421,478 | B1 | * | 7/2002 | Paiam | 385/24 |
| 6,434,292 | B1 | * | 8/2002 | Kim et al. | 385/24 |
| 6,442,308 | B1 | * | 8/2002 | Han et al. | 385/24 |
| 6,665,466 | B2 | * | 12/2003 | Katayama | 385/24 |

FOREIGN PATENT DOCUMENTS

| JP | 5-313029 | 1/1993 |
|---|---|---|
| KR | 2000-0032760 | 6/2000 |
| KR | 2000-0033948 | 6/2000 |

OTHER PUBLICATIONS

Jeong, J. S., et al., "An integrated power splitter with ultra–low loss", Integrated Photonics Research 1999, Santa Barbara, CA, Jul. 19–21, 1999, pp. 141–143.

M. R. Amersfoort, et al., "Phased–array wavelength demultiplexer with flattened wavelength response", Electronics Letters, IEE Stevenage, GB, vol. 30, No. 4, Feb. 17, 1994, pp. 300–302.

M. K. Smit, "Phasar–Based WDM–Devices: Principles, Design and Applications", IEEE Journal of Selected Topics in Quantum Electronics, IEEE Service Center, US, vol. 2, No. 2, Jun. 1, 1996, pp. 236–250.

K. Maru, et al., "Low–loss arrayed–waveguide grating with high index regions at slab–to–array interface", Electronics Letters, IEE Stevenage, GB, vol. 37, No. 21, Oct. 11, 2001, pp. 1287–1289.

* cited by examiner

Primary Examiner—Daniel Stcyr
Assistant Examiner—Daniel A. Hess
(74) Attorney, Agent, or Firm—Scully, Scott, Murphy & Presser

(57) ABSTRACT

An optical multi-demultiplexer of the present invention comprises an input waveguide to which wavelength division multiple signals are applied, a plurality of output waveguides for demultiplexing and outputting the wavelength division multiple signals, an arrayed waveguide including a plurality of channel waveguides having different waveguide lengths, an input slab waveguide, and an output slab waveguide. The input slab waveguide is provided between the input waveguide and the arrayed waveguide. The output slab waveguide is provided between the arrayed waveguide and the output waveguides. The input slab waveguide is formed with tapered island regions having a refractive index lower than that of the core layer of the slab waveguide. The island regions are situated in positions opposite the channel waveguides of the arrayed waveguide.

12 Claims, 9 Drawing Sheets

OPTICAL MULTI-DEMULTIPLEXER

CROSS-REFERENCE TO RELATED APPLICATIONS

This application is based upon and claims the benefit of priority from the prior Japanese Patent Applications No. 2001-128130, filed Apr. 25, 2001; and No. 2002-007698, filed Jan. 16, 2002, the entire contents of both of which are incorporated herein by reference.

BACKGROUND OF THE INVENTION

1. Field of the Invention

The present invention relates to an optical multi-demultiplexer used to multiplex or demultiplex wavelength division multiple signals, and more particularly, an optical multi-demultiplexer capable of reducing insertion loss and crosstalk.

2. Description of the Related Art

In the field of optical communication, a wavelength division multiplexing transmission system is examined such that light beams of different wavelengths are loaded individually with a plurality of signals and information capacity is enlarged by transmitting the signals by means of one optical fiber. In this transmission system, optical multi-demultiplexers for multiplexing or demultiplexing light beams of different wavelengths play an important role. Among various other optical multi-demultiplexers, an optical multi-demultiplexer that uses an arrayed-waveguide grating (AWG) holds promise, since it can increase the frequency of multiplexing with short wavelength intervals.

In one such optical multi-demultiplexer used in the wavelength division multiplexing transmission system, it is essential to reduce loss in a wavelength passband in consideration of the wavelength control tolerance of a semiconductor laser beam source, gain characteristics of an optical fiber amplifier, wavelength characteristics of a dispersion compensating fiber, etc. It is also important to ensure sharp rising and falling edges in the passband. Conventionally, there is a proposal to taper an end portion of an arrayed waveguide in order to reduce loss in the wavelength passband. Described in Jpn. Pat. Appln. KOKAI Publication No. 5-313029, for example, is an arrayed waveguide that has a tapered end portion on the interface between an input slab waveguide and the arrayed waveguide.

According to this prior art structure in which the end portion of the arrayed waveguide is tapered, however, a loss is caused by the difference between the respective native modes of the slab waveguide and the arrayed waveguide, so that reduction of loss is limited.

It is found that crosstalk can be reduced by maximizing the width of the slab waveguide and increasing the number of channel waveguides of the arrayed waveguide that are connected to the slab waveguide. If the channel waveguides of the arrayed waveguide are increased in number, however, they are easily influenced by the refractive index distribution and fluctuations of the channel waveguide width. This leads to adverse results including an increase in loss and a worsened crosstalk level.

Crosstalks are calculated in the following manner.

FIG. 22 shows a wavelength characteristic of a channel No. 5 out of eight channels of an AWG of 100 GHz as an example. The criterion for the calculation of crosstalks is not 0 (zero) dB but insertion loss for the center wavelength.

For example, a in FIG. 22 indicates insertion loss for the center wavelength of the channel No. 5. Further, b indicates a crosstalk between channels No. 5 and No. 6; c, crosstalk between channels No. 5 and No. 4; d, crosstalk between channels No. 5 and No. 7; e, crosstalk between channels No. 5 and No. 8; f, crosstalk between channels No. 5 and No. 3; g, crosstalk between channels No. 5 and No. 2; and h, crosstalk between channels No. 5 and No. 1.

The average of all the crosstalks in the channel No. 5 can be given by (b+c+d+e+f+g+h)/7. In this specification, the value calculated in this manner is referred to as crosstalk.

As a power splitter for splitting signal light, on the other hand, a splitter that combines a slab waveguide and channel waveguides is proposed in place of a conventional splitter that is composed of multilayered Y-branches. "An integrated power splitter with ultra-low loss" (Integrated Photonics Research 1999, Santa Barbara, Calif., Jul. 19–21, 1999, pp. 141–143) is reported as an example of the proposed splitter. In this splitter, a semiconductor with a refractive index of 3.0 or more is used as its material, and a high-refraction region with a refractive index higher than that of a core layer is provided in the slab waveguide.

Since this splitter uses a rib waveguide with a core width of 1 μm as its output waveguide, however, its mode diameter is as small as about 1 μm. Since the mode diameter of an ordinary optical fiber ranges from 9 to 10 μm, on the other hand, the mode mismatch (connection loss) in the output waveguide portion is substantial. It is feared that this difference in mode diameter should entail a loss of 13 dB or more. Thus, the loss of the whole splitter, including the splitter's own loss of 6 to 7 dB, inevitably amounts to about 20 dB, a substantial loss.

In addition, the aforesaid high-refraction region in the slab waveguide measures only 2.5 μm by 0.9 μm. Thus, the individual parts have very fine dimensions, and the layer structure is complicated, so that the manufacture of the splitter is subject to variation. Thus, the quality of the splitter lacks stability and reproducibility. It is hard, therefore, to improve insertion loss or the like remarkably by means of a splitter of this type.

SUMMARY OF THE INVENTION

The object of the present invention is to provide an optical multi-demultiplexer enjoying lowered coupling loss and improved crosstalk that is easy to manufacture.

An optical multi-demultiplexer of the present invention comprises an input waveguide to which wavelength division multiple signals are applied; a plurality of output waveguides for demultiplexing and outputting the wavelength division multiple signals; an arrayed waveguide provided between the input waveguide and the output waveguides and including a plurality of channel waveguides having different waveguide lengths; an input slab waveguide formed between the input waveguide and the arrayed waveguide; an output slab waveguide formed between the arrayed waveguide and the output waveguides; and two or more island regions having a refractive index different from that of core layers of the input and output slab waveguides, provided in at least one of the slab waveguides, and situated in positions associated with the channel waveguides of the arrayed waveguide.

According to this invention, the island regions are formed in the slab waveguide, whereby field distribution at the end point of the input slab waveguide can be approximated to field distribution in the arrayed waveguide, so that a low-loss version of the optical multi-demultiplexer can be obtained.

In the present invention, the refractive index of the island regions is lower than that of the core layer around the island regions, for example. According to this invention, light that passes through the island regions can be concentrated on the channel waveguides of the arrayed waveguide.

Preferably, in the present invention, the island regions are formed integrally with a clad layer of the slab waveguide. According to this invention, the refractive index of the island regions can be made equal to that of the clad layer. In designing mask patterns in the process of manufacturing the optical multi-demultiplexer, therefore, the island regions can be formed integrally with the clad layer in a given position in the slab waveguide by only forming patterns corresponding to the island regions. Thus, there is no necessity of changing or adding manufacturing processes despite the presence of the island regions.

In the case where the refractive index of the island regions is lower than that of the core layer around the island regions, the island regions are preferably located between axes connecting the input waveguide or the output waveguides and the channel waveguides of the arrayed waveguide. According to this invention, the island regions are provided individually between the axes that connect the input waveguide or output waveguides and the channel waveguides of the arrayed waveguide, so that the light that passes through the island regions can be concentrated on the channel waveguides of the arrayed waveguide.

In the case where the refractive index of the island regions is higher than that of the core layer around the island regions, a desired result may possibly be obtained by forming the island regions on the axes individually.

Preferably, in the present invention, each of the island regions is tapered so that the width thereof decreases toward the arrayed waveguide. If the island regions are tapered in this manner, the intensity distribution in the slab waveguide can be controlled, so that the efficiency of coupling to the arrayed waveguide can be improved. According to this invention, the degree of concentration of light on the channel waveguides of the arrayed waveguide can be further improved.

Preferably, in the present invention, the width of that end of each of the island regions which faces the arrayed waveguide is 5 $\mu$m or more and is shorter than the pitch of the channel waveguides of the arrayed waveguide. Thus, etching can be easily carried out in forming the slab waveguides, arrayed waveguide, input waveguide, and output waveguides, and the quality can be securely stabilized. In forming the clad layer, moreover, the clad layer can be securely embedded in the core layer and the island regions with good capability.

In the present invention, the width and/or position of each of the island regions should vary with regard to distance from the center of the slab waveguide toward the side portions of the slab waveguide, in some cases. For example, the respective widths of the island regions are gradually reduced from the center of the slab waveguide toward the side portions thereof. By gradually changing the respective shapes of the island regions, according to this invention, generation of side lobes can be restrained, and the crosstalk properties can be further improved.

In the present invention, a value Q can be minimized so that there is a relation N×H<40,000×(logQ)$^{-5}$, where N is the number of channels for the wavelength division multiple signals applied to the input waveguide, H (GHz) is the frequency interval, and Q is the number of channel waveguides of the arrayed waveguide. According to this invention, the array pitch of the arrayed waveguide can be widened, and the number of channel waveguides can be reduced.

Preferably, in the present invention, the width of the wider end of each of the tapered island regions accounts for 38% to 62% of the array pitch of the channel waveguides, the width of the narrower end accounts for 0% to 26% of the array pitch of the channel waveguides, the product of the length of the island region and the relative refractive index difference ranges from 0.4 to 0.6, and the distance from the island region and the connecting end of the arrayed waveguide ranges from 100 $\mu$m to 150 $\mu$m. According to this invention, loss and crosstalk can be further lowered by optimizing the respective dimensions or lengths of the opposite ends of the tapered island regions or the relative positions of the island regions and the arrayed waveguide.

Preferably, in the present invention, the array pitch of the island regions is different from the array pitch of the channel waveguides. If the array pitch of the channel waveguides is 25 $\mu$m, for example, the array pitch of the island regions is adjusted to 24.8 $\mu$m or 25.2 $\mu$m. According to this invention, field distribution at the focal point can be changed into one with a low crosstalk by slightly deviating the respective array pitches of the island regions and the channel waveguides from each other.

Preferably, in the present invention, deviations between the respective axes of the island regions and the respective axes of regions opposite the island regions and between the channel waveguides gradually increase with distance from a specific island region or as the side portions of the slab waveguide are approached. According to this invention, the field distribution at the focal point can be changed into a desired one by changing the deviation between the island regions and the channel waveguides in the direction of arrangement of the island regions.

In this specification and the accompanying drawings, insular regions of the present invention or "regions formed in the slab waveguide and having a refractive index different from that of the core layer of the slab waveguide" are referred to as "island regions" or simply as "islands" in some cases.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 6.

Figure 2:
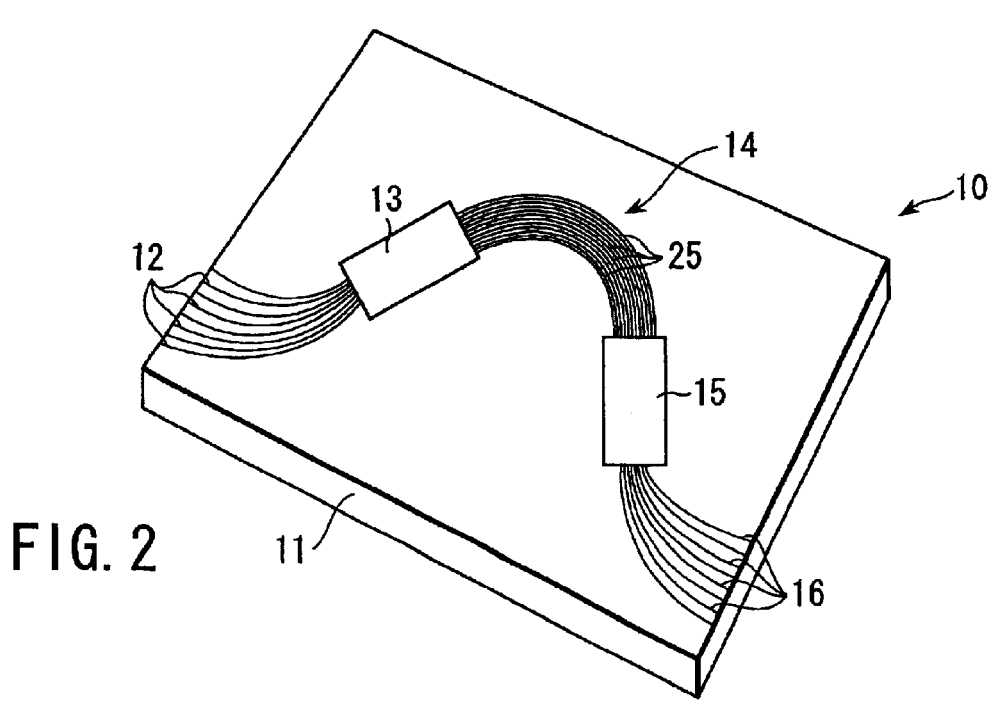
FIG. 2 is a general perspective view of the optical multi-demultiplexer shown in FIG. 1.

FIG. 2 shows a waveguide-type wavelength multiplexing multi-demultiplexer element (hereinafter referred to as optical multi-demultiplexer 10) that uses an arrayed-waveguide grating.

The optical multi-demultiplexer 10 comprises a substrate 11 formed of silica glass or silicon, for example, a plurality of input waveguides 12, an input slab waveguide 13, an arrayed waveguide 14, an output slab waveguide 15, a plurality of output waveguides 16, etc. Optical fibers (not shown) are connected optically to the input waveguides 12, which receive wavelength division multiple signals through the optical fibers.

Figure 3:
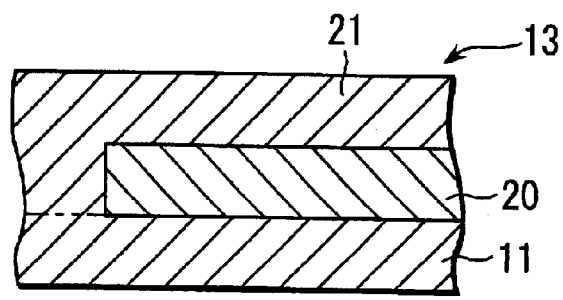
FIG. 3 is a sectional view of a part of the optical multi-demultiplexer taken along line F3—F3 of FIG. 1.

As shown in FIG. 3, the input slab waveguide 13 is provided with the substrate 11 of silica glass, a core layer 20 spread flat on the substrate 11, and a clad layer 21 covering the core layer 20. The input slab waveguide 13 is formed between the input waveguides 12 and the arrayed waveguide 14, and optically connects the waveguides 12 and 14. The wavelength division multiple signals delivered from the input waveguides 12 to the input slab waveguide 13 are spread in the core layer 20 of the waveguide 13 by a diffraction effect, and land on channel waveguides 25 of the arrayed waveguide 14.

The arrayed waveguide 14 includes a plurality of channel waveguides 25. The respective lengths of each two adjacent channel waveguides 25 are somewhat different. Therefore, the wavelength division multiple signals delivered from the one end of the channel waveguides 25 undergoes an optical phase shift for each frequency as they propagate to the other end of the channel waveguides 25. This phase shift depends on the wavelength of light, and the wave front of converged light is inclined according to the wavelength. Thus, the respective positions of convergence of light beams in the output slab waveguide 15 vary depending on the respective wavelengths of the beams.

The light beams with different wavelengths demultiplexed in this manner are fetched individually from separate output waveguides 16 according to the wavelengths. Thus, the output slab waveguide 15 is formed between the arrayed waveguide 14 and the output waveguides 16. The waveguide 15 optically connects the waveguides 14 and 16. The output slab waveguide 15 may be constructed substantially in the same manner as the input slab waveguide 13.

For convenience, in this specification, the waveguides (e.g., waveguides 12) on the incidence side are referred to as input waveguides, and the waveguides (e.g., waveguides 16) on the emission side as output waveguides. If the light is incident in the opposite direction, however, the waveguides 12 serve as the output waveguides, and the waveguides 16 as the input waveguides. Thus, the optical multi-demultiplexer 10 can fulfill equal functions with respect to either direction of signal light transmission.

Figure 1:
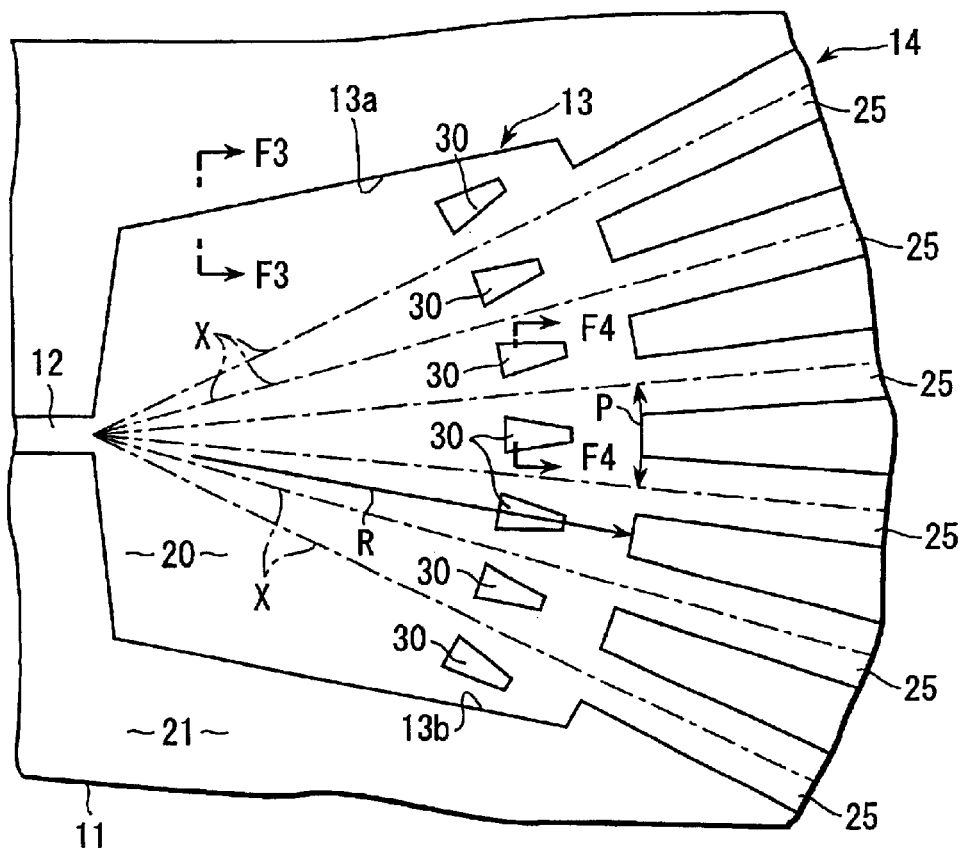
FIG. 1 is a plan view of a part of an optical multi-demultiplexer according to an embodiment of the invention.

The optical multi-demultiplexer 10 is provided with two or more island regions 30 (typically shown in FIG. 1) in the input slab waveguide 13 and/or the output slab waveguide 15. The regions 30 have a refractive index different from that of the core layer 20 of the slab waveguide 13 or 15. FIG. 1 representatively shows only one of the input waveguides 12.

Figure 4:
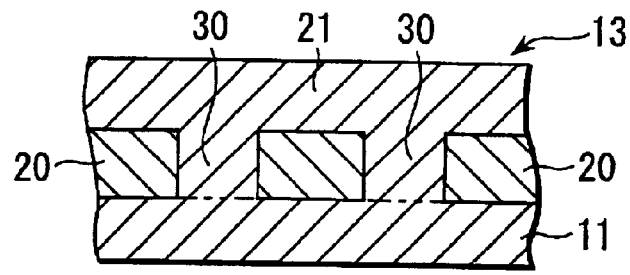
FIG. 4 is a sectional view of a part of the optical multi-demultiplexer taken along line F4—F4 of FIG. 1.

In the case of this embodiment, the refractive index of the island regions 30 is lower than that of the core layer 20 that surrounds the regions 30. As shown in FIG. 4, the island regions 30 are formed on the substrate 11 formed of silica glass or the like, and preferably, formed integrally with the clad layer 21 of the input slab waveguide 13.

The island regions 30 are formed in positions that are associated with the channel waveguides 25 of the arrayed waveguide 14, individually. More specifically, if the refractive index of the island regions 30 is lower than that of the core layer 20, the island regions 30 are formed individually between axes X that connect each input waveguide 12 and the channel waveguides 25 of the arrayed waveguide 14, as shown in FIG. 1.

These island regions 30 are arranged at spaces from the center of the input slab waveguide 13 toward opposite side portions 13a and 13b. Besides, the island regions 30 of this embodiment are formed so that the distance from each channel waveguide 25 of the arrayed waveguide 14 is fixed. The number of island regions 30 is one more than the number of channel waveguides 25.

If the island regions 30 are tapered, as in the case of this embodiment, the optical power distribution in the input slab waveguide 13 can be more easily coupled to the channel waveguides 25 of the arrayed waveguide 14, as mentioned later. Thus, the optical power can be efficiently concentrated on the arrayed waveguide 14 even if each array pitch P (shown in FIG. 1) of the channel waveguides 25 is widened to about 30 μm or more, for example. If the channel waveguides 25 are reduced in number, therefore, loss in the optical multi-demultiplexer 10 as a whole cannot be increased, and crosstalk cannot be worsened.

Figure 5:
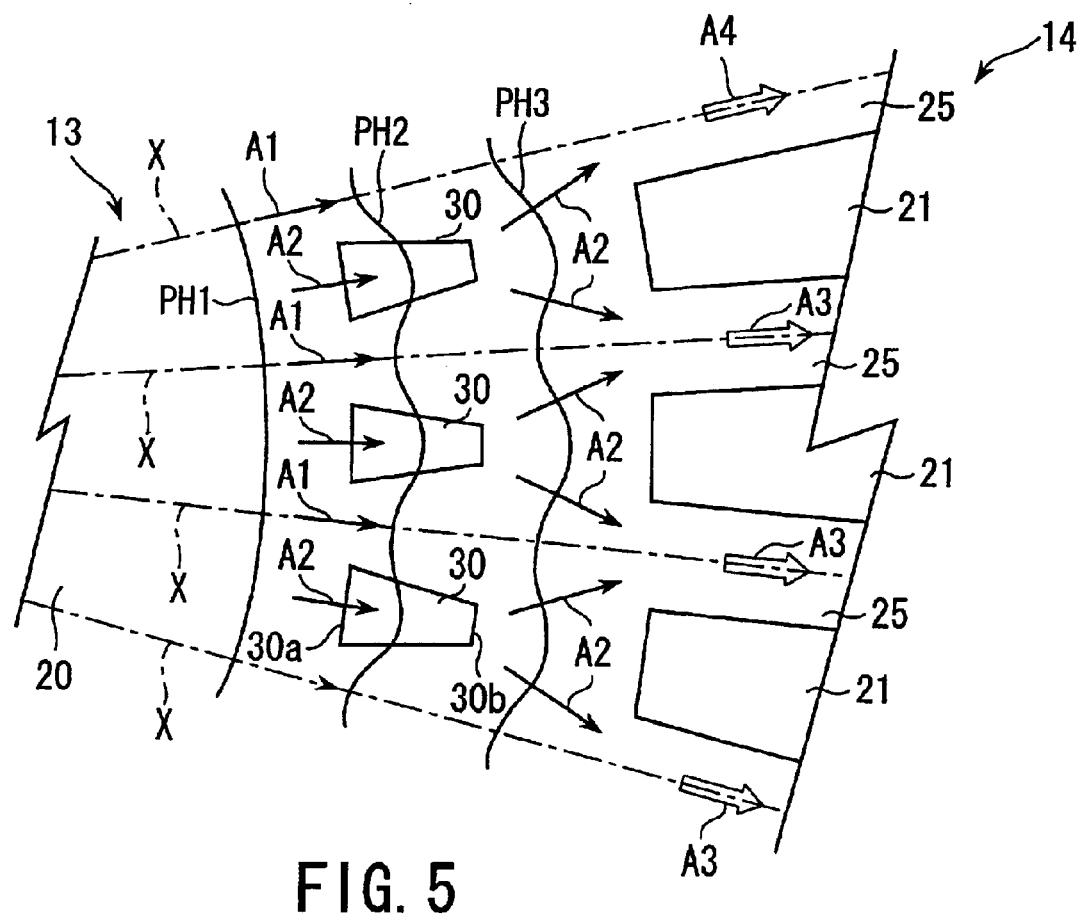
FIG. 5 is an enlarged view showing the principal part of the optical multi-demultiplexer shown in FIG. 1.
Figure 6:
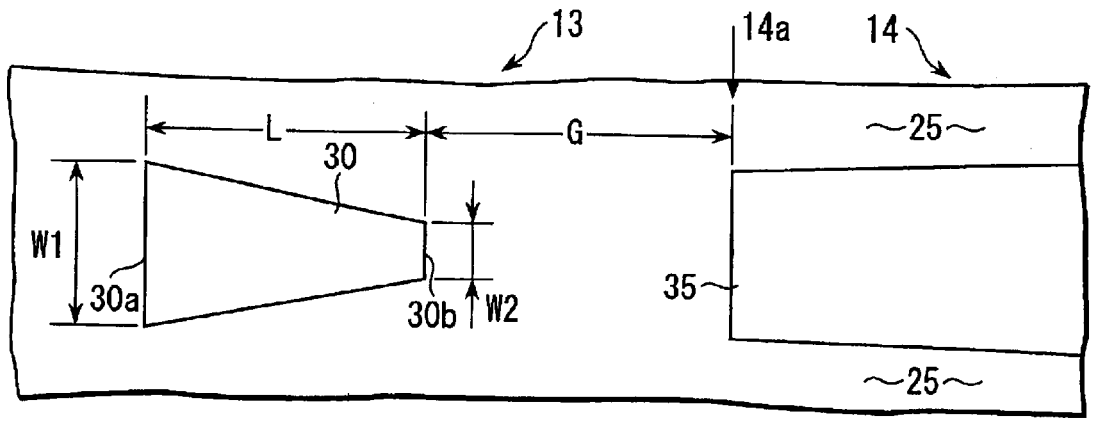
FIG. 6 is a plan view of an island region of the optical multi-demultiplexer shown in FIG. 1.

As shown in the enlarged views of FIGS. 5 and 6, each island region 30 of this embodiment is tapered (in the shape of an elongate trapezoid) so that a width W1 of one end 30a, as viewed toward the arrayed waveguide 14, is greater than a width W2 of the other end 30b. The width W2 of that end 30b of each island region 30 which faces the arrayed waveguide 14 is 5 μm or more and is shorter than the pitch P of the channel waveguides 25. A length L of each island region 30 ranges from 50 μm to 100 μm, for example.

Figure 7:
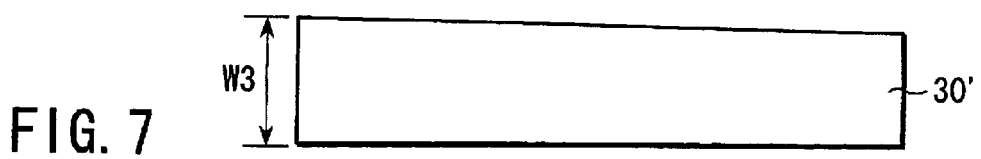
FIG. 7 is a plan view of an island region of an optical multi-demultiplexer according to a second embodiment of the invention.

FIG. 7 shows an island region 30' according to a second embodiment of the present invention. The island region 30' has a substantially fixed width W3 (or is rectangular) throughout its length from one end to the other. Since the island region 30' shares other configurations with those of the optical multi-demultiplexer 10 of the first embodiment, a description of those configurations is omitted.

The following is a description of a manufacturing method for the optical multi-demultiplexer 10 of the first embodiment.

Silica glass is used for the substrate 11. The respective core layers 20 of the slab waveguides 13 and 15 and the channel waveguides 25 of the arrayed waveguide 14 are integrally formed of silica glass doped with germanium and have a thickness of 6 μm. The glass material may be formed by the chemical vapor deposition (CVD), flame deposition (FHD), or vapor deposition. The refractive index ($nc_1$) of the clad layer 21 was adjusted to $nc_1$=1.4574, the refractive index ($nc_0$) of the core layer 20 and each channel waveguide 25 to $nc_0$=1.4684, the relative refractive index difference to Δ=0.75%, and the sectional area of each channel waveguide 25 to 6×6 $\mu m^2$.

Figure 8:
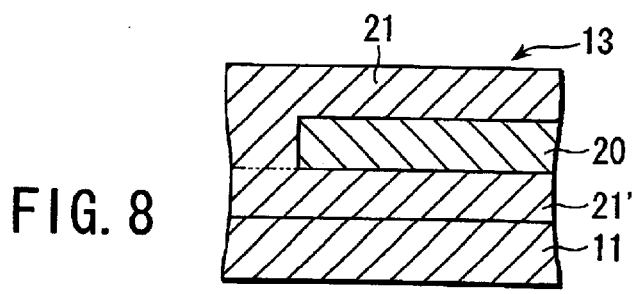
FIG. 8 is a sectional view of a part of an optical multi-demultiplexer according to a third embodiment of the invention.
Figure 9:
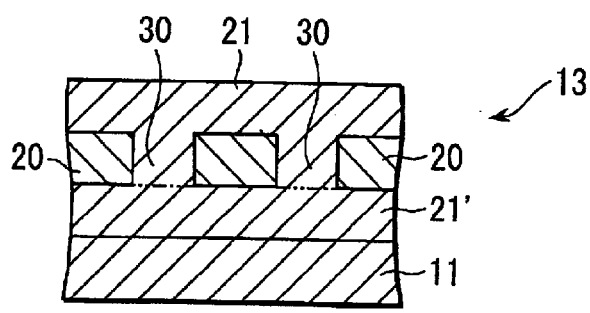
FIG. 9 is a sectional view of an island region of the optical multi-demultiplexer shown in FIG. 8.

The respective patterns of the core layer 20 and the island regions 30 were simultaneously formed by reactive ion etching. After the patterns were formed, the clad layer 21 was formed into a given thickness. Each island region 30 of this embodiment is formed by partially scooping the core layer 20 and filling the resulting hollow with a part of the clad layer 21. In a slab waveguide 13 of an optical multi-demultiplexer according to a third embodiment shown in FIGS. 8 and 9, silicon is used for a substrate 11. In the slab waveguide 13, a lower clad layer 21' is formed between the substrate 11 and a core layer 20.

The following is a description of the operation of the optical multi-demultiplexer 10.

Wavelength division multiple signal beams from the input waveguides 12 incident on the input slab waveguide 13 spread in the waveguide 13 in the width direction thereof. In FIG. 5, PH1 designates a wavefront of the incident signal beams. Among the spread signal beams, beams A1 that are directed toward the channel waveguides 25 of the arrayed waveguide 14 without passing through the island regions 30 advance straight along the axes X and land on the channel waveguides 25, individually.

Among the light beams from the input waveguides 12 incident on the input slab waveguide 13, some beams A2 reach the island regions 30, individually. If the refractive index of the island regions 30 is lower than that of the core layer 20, the beams A2 that pass through the island regions 30 tend to have their phases advance faster than those of the beams A1 that never pass through the island regions 30. Accordingly, the wavefront is deformed as indicated by PH2, so that the advancing direction of the beams A2 is slightly inclined.

The shape and position of each island region 30 are optimized so that the inclination of the advancing direction of the beams A2 is directed toward the channel waveguides 25 of the arrayed waveguide 14. By doing this, the beams A2 can be concentrated on the channel waveguides 25 of the arrayed waveguide 14. Thus, light beams that leak to the clad layer 21 from between the channel waveguides 25 are reduced, so that coupling loss from the input slab waveguide 13 to the arrayed waveguide 14 lessens.

In the case of a conventional optical multi-demultiplexer that is not provided with the island regions 30, some of light beams from input waveguides incident on an input slab waveguide leak to a clad layer from between channel waveguides. The beams leaked to the clad layer are in a radiation mode, not in a guided mode, and most of them are lost. Some of these radiated beams may reach an output slab waveguide, in some cases. Since their phases are not controlled at all, these beams cause noise in the output slab waveguide and worsen crosstalk.

Figure 10:
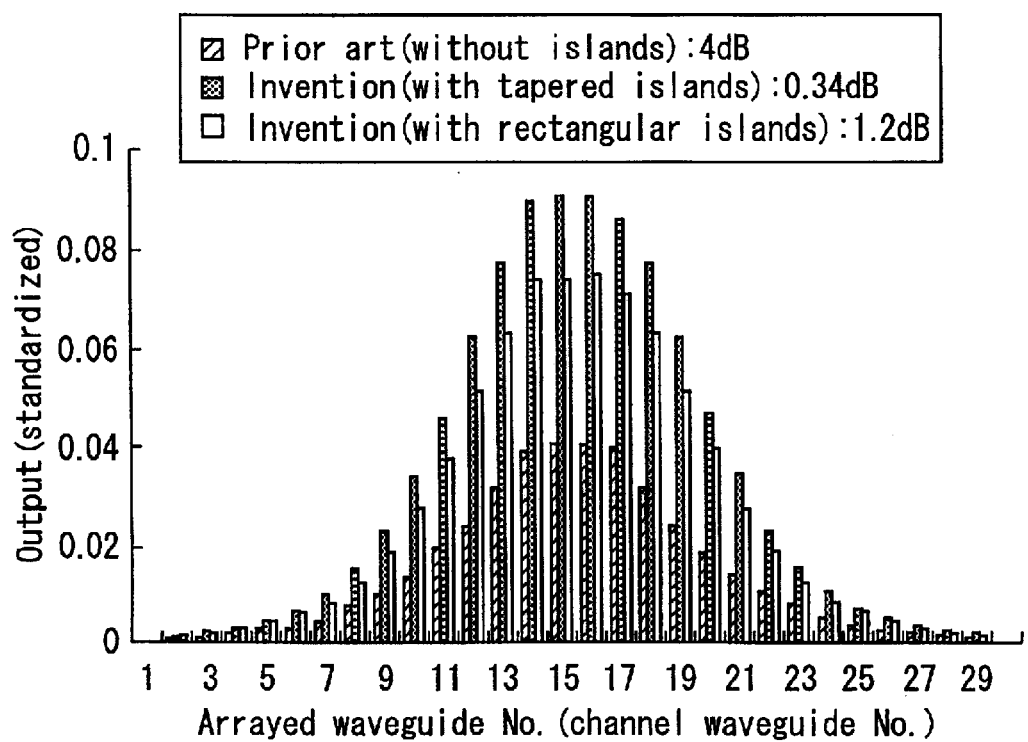
FIG. 10 is a diagram showing the respective outputs of the optical multi-demultiplexers of the first and second embodiments and a conventional optical multi-demultiplexer.

The inventors hereof conducted a simulation to couple light from the input slab waveguide 13 to the arrayed waveguide 14. In this simulation, the conventional structure (without the island regions 30) and the structures of the foregoing embodiments having the island regions 30 were checked for variation in coupling loss. FIG. 10 shows the result of this simulation.

As conditions for this simulation, the refractive index ($nc_1$) of the clad layer 21 was adjusted to $nc_1$=1.4574, the refractive index ($nc_0$) of the core layer 20 and each channel waveguide 25 to $nc_0$=1.4692, the relative refractive index difference to Δ=0.75%, the sectional area of each channel waveguide 25 to 6×6 $\mu m^2$, the slab waveguide radius to R=2,380 μm, and the demultiplexing interval to 705 GHz in terms of frequency (Δλ=5.64 nm in terms of wavelength).

The simulation indicated that the loss of the conventional structure was 4 dB. It was confirmed, on the other hand, that the loss could be reduced to 0.34 dB according to the first embodiment of the invention (provided with the tapered island regions 30 shown in FIG. 6). It was confirmed, moreover, that the loss could be reduced to 1.2 dB according to the second embodiment of the invention (provided with the rectangular island regions 30' shown in FIG. 7).

The respective lengths of each two adjacent ones of the channel waveguides 25 that constitute the arrayed waveguide 14 are somewhat different. Therefore, the wavelength division multiple signals applied to the arrayed waveguide 14 undergoes an optical phase shift for each frequency as they propagate from the channel waveguide 25 to the output slab waveguide 15. As this is done, wavelength multiplexing signal beams are focused on different points according to the wavelength. In consequence, light beams having their respective wavelengths are dividedly incident on the output waveguides 16.

The island regions 30 may possibly be provided on both in input and output slab waveguides 13 and 15 or on only one of the slab waveguides 13 and 15. The case depends on the way of use of the optical multi-demultiplexer of the waveguide-grating type (e.g., optical multi-demultiplexer 10 of each of the foregoing embodiments).

In the case where the island regions 30 are not formed in the output slab waveguide 15, for example, the slab waveguide 15 is shorter than in the case where the island regions 30 are not formed. This is because the point of convergence is settled when light from the arrayed waveguide 14 reaches the output slab waveguide 15. If the island regions 30 are formed in the output slab waveguide 15, light is influenced again by phase change as it pass through the island regions 30. In this case, therefore, the distance from the point of convergence is settled when the passage through the island regions 30 is finished.

By successively changing the width of the island regions 30 from the center of the input slab waveguide 13 toward the opposite side portions, for example, generation of side lobes can be restrained, and the crosstalk properties can be further improved. In the case where all the island regions 30 have the same shape, positions that meet the conditions for the generation of side lobes approach the main lobe, so that leakage of light to output waveguides other than a specific one tends to increase.

By gradually changing the respective shapes of the island regions 30, therefore, the positions that meet the conditions for the generation of the side lobes can be kept wide apart from the main lobe. Thus, light beams that are incident on output waveguides other than the specific one can be reduced.

The inventors hereof conducted a simulation to analyze the wavelength characteristics of the conventional optical multi-demultiplexer without the island regions 30, thereby obtaining insertion loss and crosstalk values. In consequence, the minimum insertion loss and the crosstalk level of any other channels than adjacent ones were found to be −4.46 dB and 41.38 dB, respectively. The number (N) of channels for the signal beams was adjusted to 8, the refractive index ($nc_1$) of the clad layer to $nc_1$=1.4574, the refractive index ($nc_0$) of the core layer to $nc_0$=1.4692, the relative refractive index difference to $\Delta$=0.75%, the sectional area of each channel waveguide to 6×6 $\mu m^2$, the slab waveguide radius to R=2,380 $\mu m$, and the demultiplexing interval to 705 GHz in terms of frequency ($\Delta\lambda$=5.64 nm in terms of wavelength).

In the case of the optical multi-demultiplexer 10 of each of the foregoing embodiments in which a plurality of island regions 30 with the same shape are situated in equivalent positions with respect to the directions of the respective axes X of the slab waveguides, on the other hand, the insertion loss and the crosstalk were found to be −1.81 dB and 41.39 dB, respectively. Thus, it was confirmed that the insertion loss of the optical multi-demultiplexer 10 was about 2.7 dB better than that of the conventional example.

The inventors hereof also conducted a simulation for an embodiment such that the respective positions of the island regions 30 with the same shape are gradually varied with respect to the directions of the respective axes X of the slab waveguides. In this embodiment, the insertion loss and the crosstalk were found to be −3.27 dB and 50.45 dB, respectively. Thus, it was confirmed that the crosstalk value of this embodiment was about 10 dB better than that of the conventional example without the island regions 30.

Figure 11:
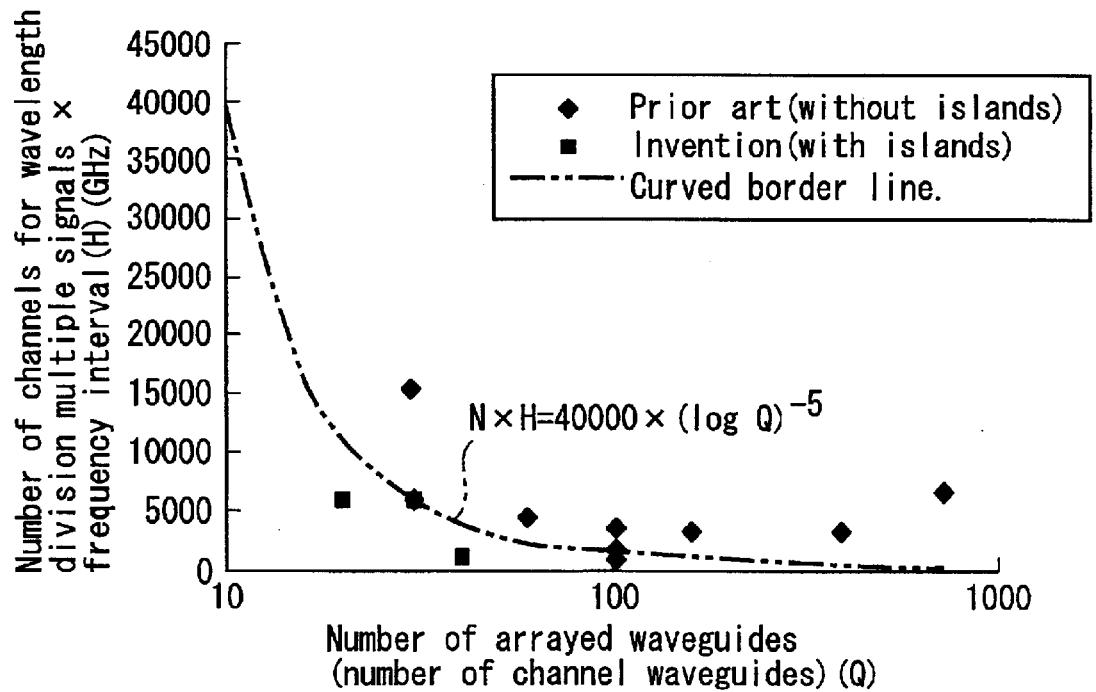
FIG. 11 is a diagram showing the relationship between the number of channel waveguides and the product of the number of signal beam channels and the frequency interval.

Further, the inventors hereof examined the relation between the channel waveguide number Q of the arrayed waveguide 14 and the product of the signal beam channel number N and the frequency interval H. FIG. 11 is a graph obtained by plotting the relation. In the case provided with the island regions 30, there are plots inside a curved border line $N \times H=40,000\times(\log Q)^{-5}$. In the conventional case without the island regions 30, on the other hand, plots were found to exist outside the curved border line.

Thus, in the case of the conventional optical multi-demultiplexer without the island regions 30, the number of channel waveguides 25 tends to increase if the channel number N and the frequency interval H are fixed. This is unavoidable in view of design for the achievement of a given insertion loss and the improvement of crosstalk. In the optical multi-demultiplexer 10 according to each of the embodiments of the invention, on the other hand, the island regions 30 are formed in at least one of the slab waveguides 13 and 15. In this case, light can be efficiently coupled to the arrayed waveguide 14, so that the number of channel waveguides 25 can be made smaller than in the conventional case.

In each of the tapered island regions 30 shown in FIGS. 1 and 6, the width of the wider end 30a is indicated by W1, the width of the other or narrower end 30b by W2, the length of each island region 30 by L, the array pitch of the channel waveguides 25 by P, and the distance from the other end 30b of each island region 30 to a connecting end 14a of the arrayed waveguide 14 by G. In order to discriminate a target loss criterion from the loss of the conventional arrayed-waveguide grating (AWG), according to the present embodiment, it is adjusted to 1.5 dB, a practical smaller value. The array pitch P of the channel waveguides 25 is 25 $\mu m$.

Figure 12:
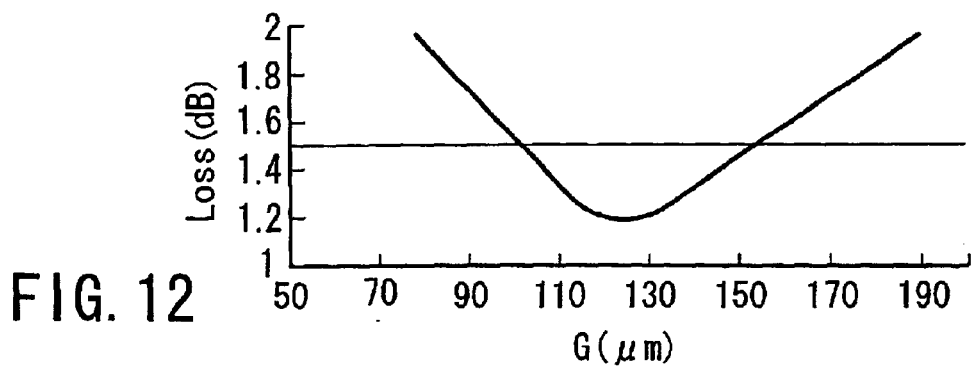
FIG. 12 is a diagram showing the relationship between loss and a distance G between the island region and an arrayed waveguide shown in FIG. 6.

FIG. 12 shows a change of loss made when the distance G was changed. When the distance G ranged from 100 $\mu m$ to 150 $\mu m$, the target value 1.5 dB could be ensured.

Figure 13:
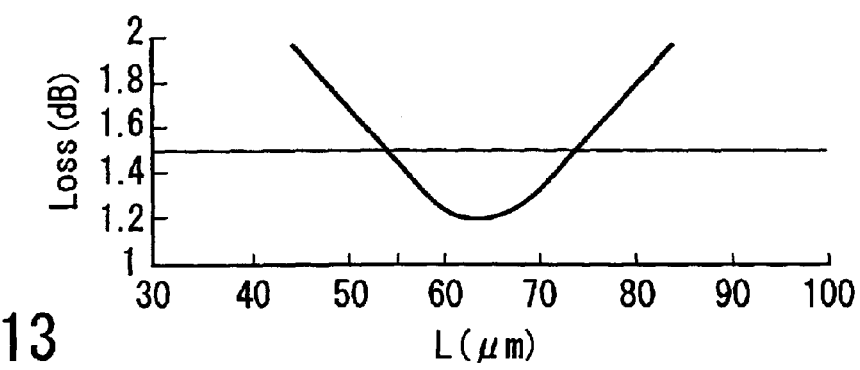
FIG. 13 is a diagram showing the relationship between loss and a length L of the island region shown in FIG. 6.

FIG. 13 shows a change of loss made when the length L was changed. When the length L ranged from 55 $\mu m$ to 75 $\mu m$, the target value 1.5 dB could be ensured. The length L is in inverse proportion to the change of the relative refractive index difference $\Delta$ between the core layer 20 and the clad layer 21. If the relative refractive index difference $\Delta$ changes, therefore, the product of the length L ($\mu m$) and the relative refractive index difference $\Delta$ is substantially fixed.

In this embodiment, for example, the refractive index ($nc_1$) of the clad layer 21 is 1.4574, and the refractive index ($nc_0$) of the core layer 20 and each channel waveguide 25 is 1.4684, so that the relative refractive index difference $\Delta$ is 0.0075. In the case where the relative refractive index difference $\Delta$ is adjusted to 0.0075, the target value 1.5 dB can be ensured if the product (L×$\Delta$) of the length L ($\mu m$) and the relative refractive index difference $\Delta$ ranges from 0.4 to 0.6.

Figure 14:
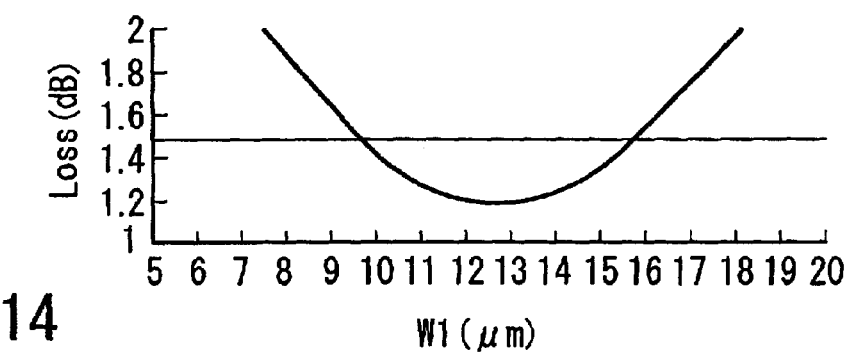
FIG. 14 is a diagram showing the relationship between loss and a width W1 of one end of the island region shown in FIG. 6.

FIG. 14 shows a change of loss made when the width W1 of one end 30a of each tapered island region 30 was changed. When the width W1 ranged from 9.5 $\mu m$ to 15.5 $\mu m$, the target value 1.5 dB could be ensured. Since the array pitch of the channel waveguides 25 is 25 $\mu m$, the range from 9.5 $\mu m$ to 15.5 $\mu m$ is equivalent to 38% to 62% of the array pitch P.

Figure 15:
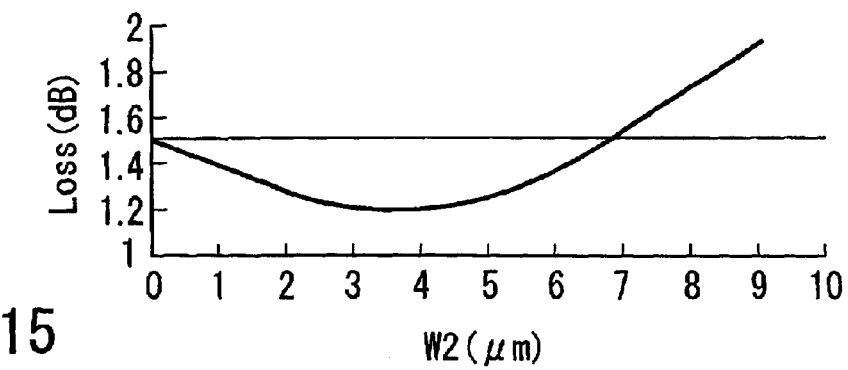
FIG. 15 is a diagram showing the relationship between loss and a width W2 of the other end of the island region shown in FIG. 6.

FIG. 15 shows a change of loss made when the width W2 of the other end 30b of each tapered island region 30 was changed. When the width W2 ranged from 0 $\mu m$ to 6.5 $\mu m$, the target value 1.5 dB could be ensured. Since the array pitch P of the channel waveguides 25 is 25 $\mu m$, the range from 0 $\mu m$ to 6.5 $\mu m$ is equivalent to 0% to 26% of the array pitch P. If W2 accounts for 0% of the pitch P, it implies that the other end 30b of the island region 30 is sharp-pointed like the vertex of an isosceles triangle.

For these reasons, it is advisable to adjust the width W1 to 38% to 62% of the array pitch P, the width W2 to 0% to 26% of the array pitch P, the product of the length L ($\mu m$) and the relative refractive index difference $\Delta$ to 0.4 to 0.6, and the distance G from the other end 30b of each island region 30 to the connecting end 14a of the arrayed waveguide 14 to 100 µm to 150 µm.

Figure 16:
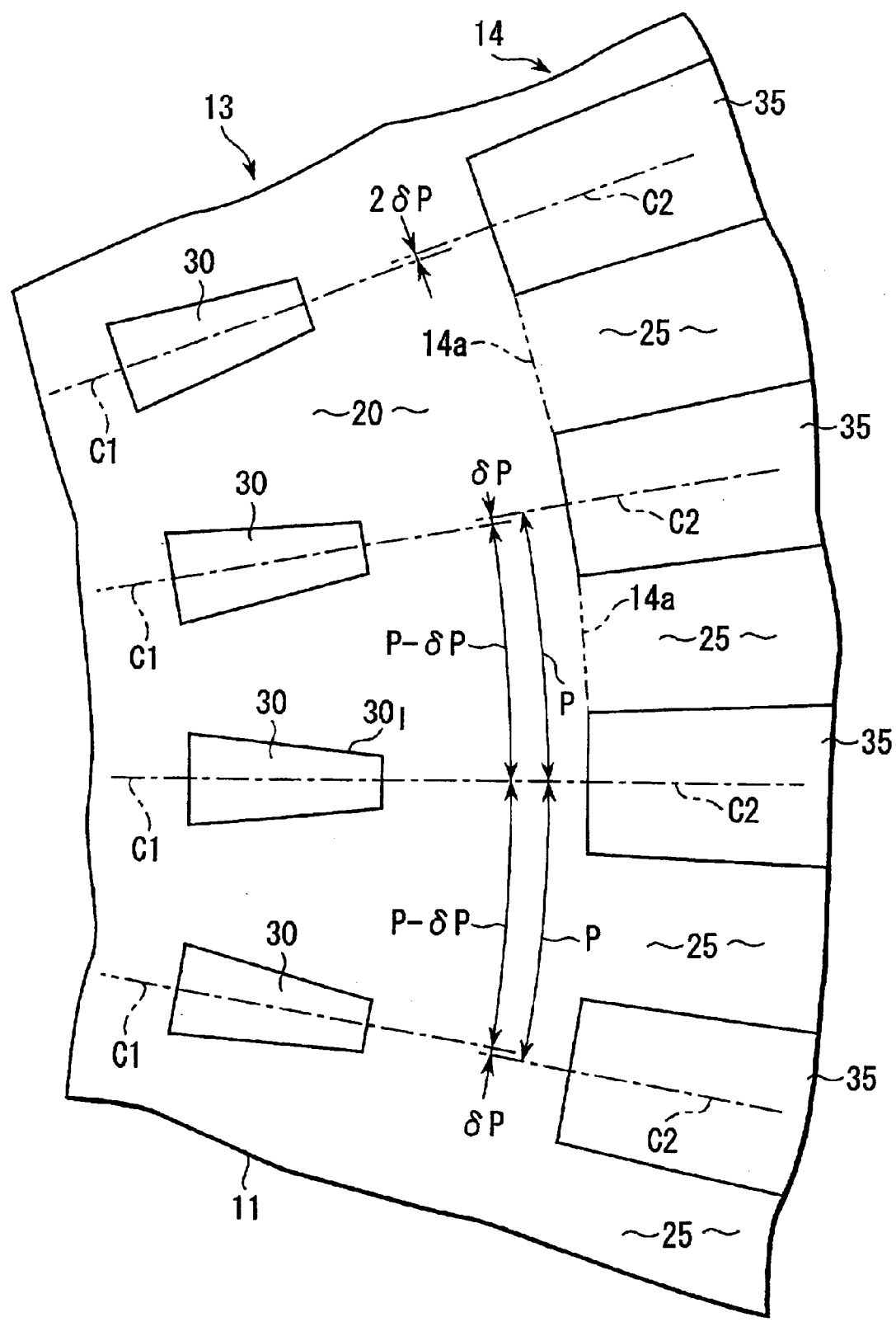
FIG. 16 is a plan view of a part of an optical multi-demultiplexer according to a fourth embodiment of the invention.

FIG. 16 shows a slab waveguide 13 and an arrayed waveguide 14 of an optical multi-demultiplexer according to a fourth embodiment of the invention. In order to improve crosstalk, in this embodiment, the array pitch of island regions 30 and an array pitch P of channel waveguides 25 are slightly deviated from each other by δP. In this specification, the difference between the pitch of axes C1 of the island regions 30 and the pitch P of the channel waveguides 25 at a connecting end 14a of the arrayed waveguide 14 is referred to as a chirping level δP.

For example, the array pitch P of the channel waveguides 25 and the chirping level δP are adjusted to 25 µm and 0.2 µm, respectively. In this case, the pitch of the island regions 30 is adjusted to 24.8 µm or 25.2 µm.

More specifically, let it be supposed that the axis of each island region 30 and the axis of a region 35 between each two adjacent channel waveguides 25 and opposite the island region 30 are C1 and C2, respectively, as shown in FIG. 16. In this case, the island regions 30 are arranged at pitches (P−δP) such that the deviation between C1 and C2 gradually increases from a specific island region 301 toward the opposite side portions 13a and 13b (shown in FIG. 1) of the slab waveguide 13. Thus, the array pitch of the island regions 30 is smaller than the array pitch P of the channel waveguides 25 by δP.

Accordingly, the axis C1 of an nth island region 30 as counted from the specific island region $30_1$ is deviated from the axis C2 of the arrayed waveguide 14 by (n×δP). The specific island region 301 is an island region that is situated in the center of the input slab waveguide 13 with respect to the width direction, for example. In this case, the deviation (n×δP) between the axes C1 and C2 increases from the specific island region 301 toward the opposite side portions of the input slab waveguide 13.

The field distribution (remote field) at the optical point of convergence is controlled by deviating the respective pitches of the island regions 30 and the channel waveguides 25 from each other in this manner. By doing this, those components of the optical power that influence crosstalk can be restrained satisfactorily.

Figure 17:
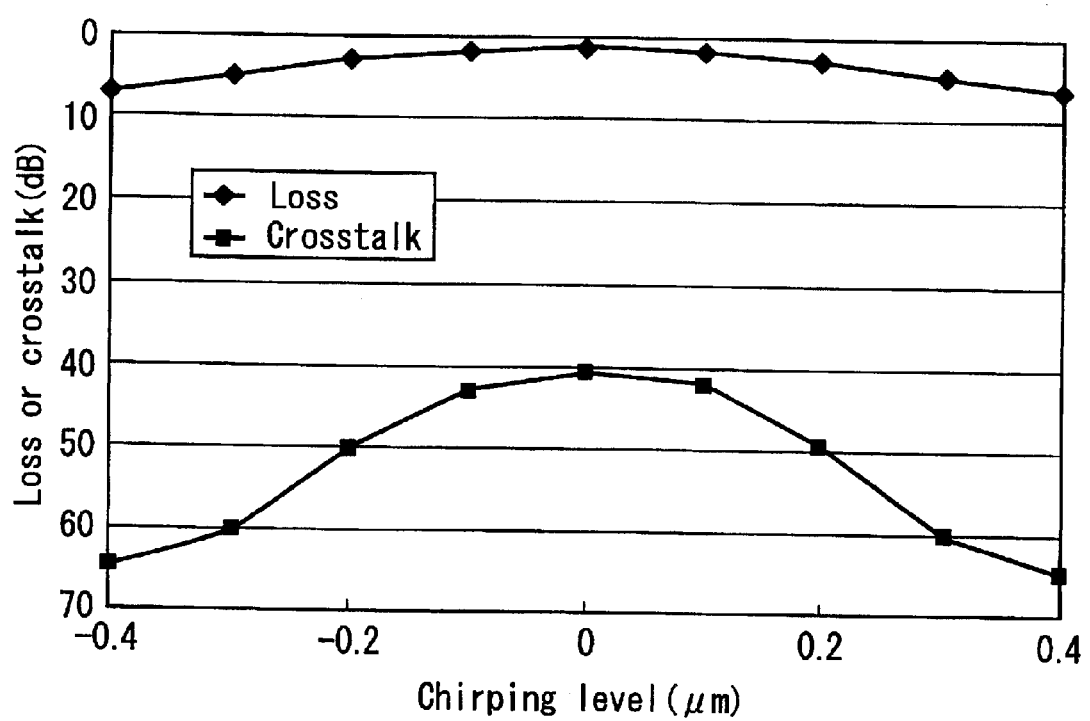
FIG. 17 is a diagram showing relationships between the chirping level of island regions shown in FIG. 16, loss, and crosstalk.

FIG. 17 shows the results of simulations in which changes of loss and crosstalk were obtained when the chirping level δP was changed. The number of channels was adjusted to 8, the slab waveguide radius to 9,381 µm, the number of channel waveguides to 60, and the pitch P of the channel waveguides to 25 µm. The respective length difference between each two adjacent channel waveguides is 126 µm. In this configuration, the wavelength interval is about 0.8 nm, which is equivalent to the frequency interval of 100 GHz. It was confirmed that the crosstalk level falls with the increase of the chirping level, as shown in FIG. 17. Although the insertion loss somewhat increases as the crosstalk level lowers, it is only about 7 dB at the maximum. As compared with the level of the type without any island regions, therefore, this level is still low enough for practical use. The best result was obtained when the chirping level was at ±0.4 µm.

Figure 18:
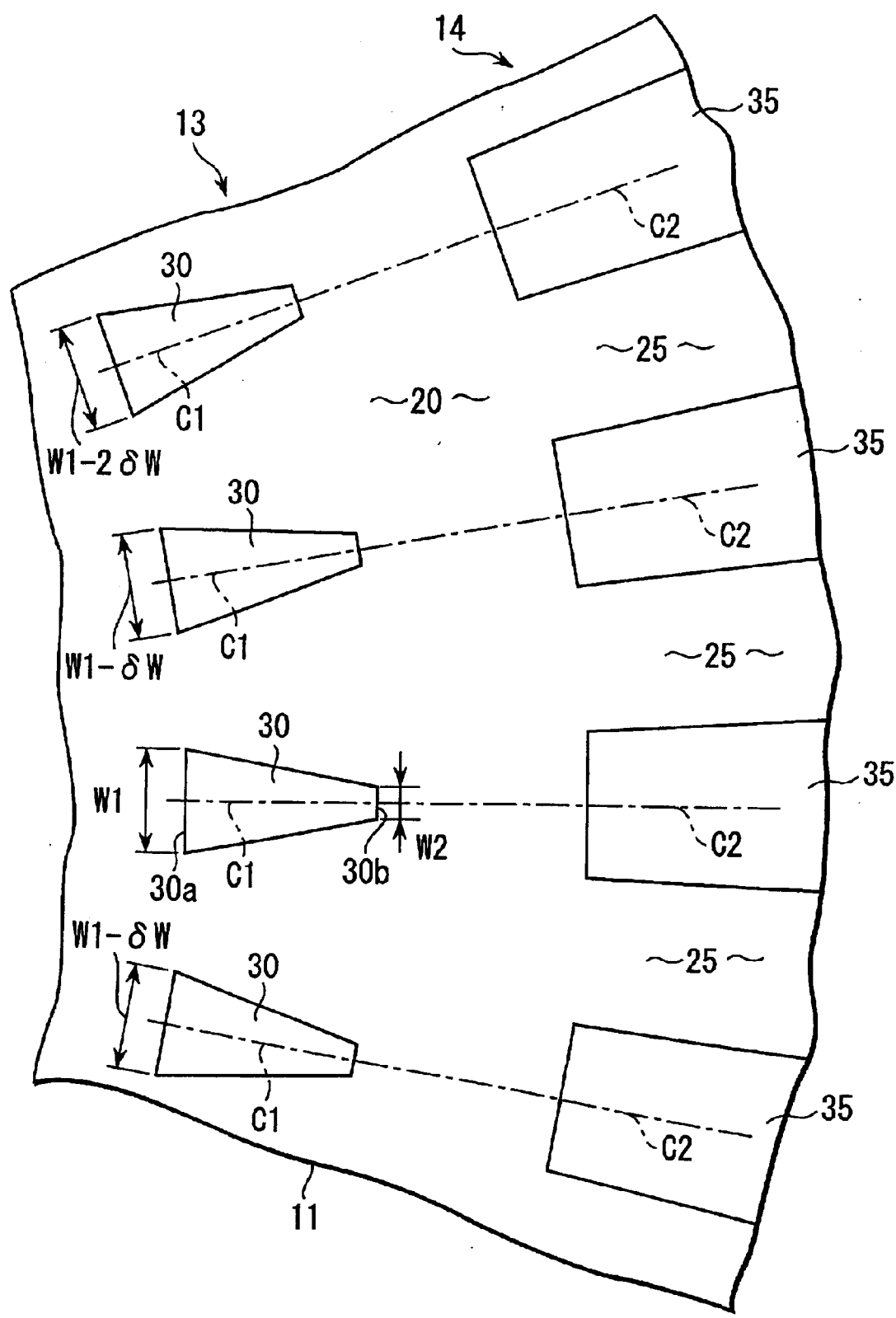
FIG. 18 is a plan view of a part of an optical multi-demultiplexer according to a fifth embodiment of the invention.

FIG. 18 shows a slab waveguide 13 and an arrayed waveguide 14 of an optical multi-demultiplexer according to a fifth embodiment of the invention. In order to improve crosstalk, in this embodiment, the width W1 of the one end 30a of each tapered island region 30 is gradually reduced by δW at a time from the center of the input slab waveguide 13 toward the opposite side portions. The width W2 of the other end 30b of each island region 30 is fixed. The fifth embodiment arranged in this manner, like the fourth embodiment, can reduce the crosstalk level.

Figure 19:
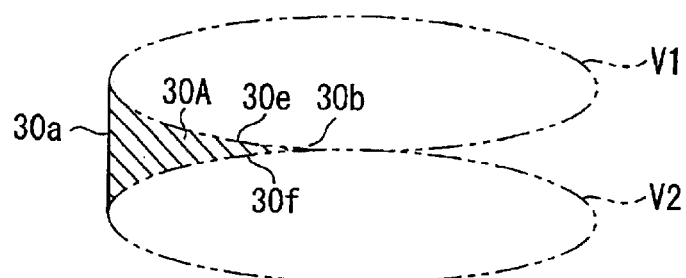
FIG. 19 is a plan view showing an island region according to a sixth embodiment of the invention by hatching.

FIG. 19 shows an island region 30A according to a sixth embodiment of the invention by hatching. Opposite side faces 30e and 30f of this island region 30A have a taper shape such that they individually extend along opposite half arcs of two adjacent ellipses V1 and V2.

Figure 20:
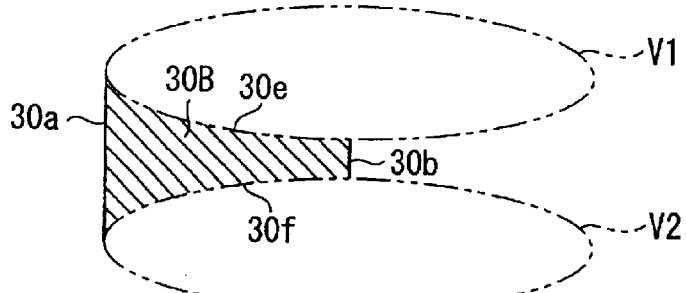
FIG. 20 is a plan view showing an island region according to a seventh embodiment of the invention by hatching.

FIG. 20 shows an island region 30B according to a seventh embodiment of the invention. Opposite side faces 30e and 30f of this island region 30B have a taper shape such that they individually extend along opposite half arcs of two separate ellipses V1 and V2.

Figure 21:
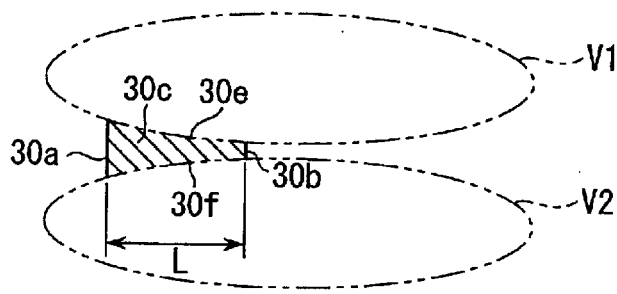
FIG. 21 is a plan view showing an island region according to an eighth embodiment of the invention by hatching.
Figure 22:
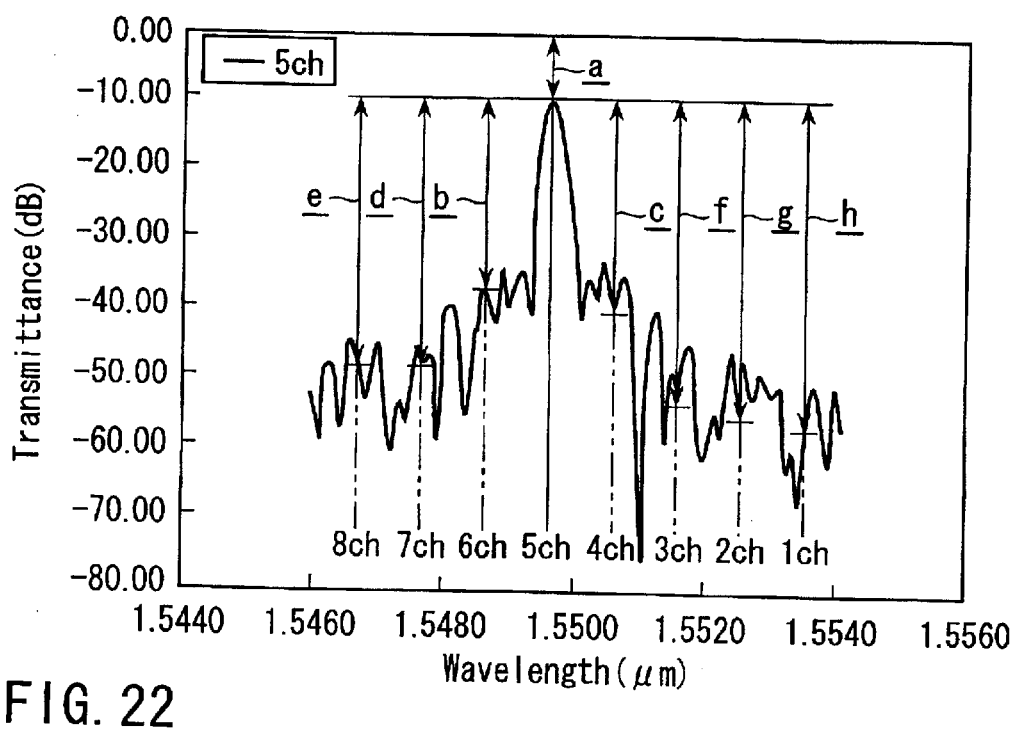
FIG. 22 is a wavelength characteristic curve for illustrating crosstalk.

FIG. 21 shows an island region 30C according to an eighth embodiment of the invention. A length L of this island region 30C is shorter than a half arc of each of ellipses V1 and V2 in the direction of the major axis thereof.

With use of the island regions 30A, 30B and 30C having the side faces 30e and 30f that extend along the ellipses, light incident on the island regions 30A, 30B and 30C can be efficiently concentrated on the channel waveguides 25.

According to the present invention, the insertion loss and crosstalk can be reduced by increasing the number of channel waveguides of the arrayed waveguide and the number of island regions. This effect may be also obtained with use of the conventional arrayed-waveguide grating (AWG). With use of the structure of the present invention that has the island regions in the slab waveguide, in particular, however, the insertion loss and crosstalk can be reduced more effectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical multi-demultiplexer comprising:
   an input waveguide to which wavelength division multiple signals are applied;
   a plurality of output waveguides for demultiplexing and outputting the wavelength division multiple signals;
   an arrayed waveguide provided between the input waveguide and the output waveguides and including a plurality of channel waveguides having different waveguide lengths;
   an input slab waveguide formed between the input waveguide and the arrayed waveguide, said input slab waveguide including a core layer and a clad layer and having axes extending from the input waveguide to the channel waveguides;
   an output slab waveguide formed between the arrayed waveguide and the output waveguides, said output slab waveguide including a core layer and a clad layer and having axes extending from the output waveguides to the channel waveguides, and
   two or more island regions having a refractive index different from that of the core layers of the input and output slab waveguides and provided in at least one of the slab waveguides and situated in positions associated with the channel waveguides of the arrayed waveguide and is an elongated one extending along one of said axes;

wherein the refractive index of said island regions is lower than that of the core layer around the island regions and said island regions are formed integrally with the clad layer of the slab waveguide.

2. An optical multi-demultiplexer according to claim 1, wherein said island regions are formed between axes connecting the input waveguide or the output waveguides and the channel waveguides of the arrayed waveguide.

3. An optical multi-demultiplexer comprising:
an input waveguide to which wavelength division multiple signals are applied;
a plurality of output waveguides for demultiplexing and outputting the wavelength division multiple signals;
an arrayed waveguide provided between the input waveguide and the output waveguides and including a plurality of channel waveguides having different waveguide lengths;
an input slab waveguide formed between the input waveguide and the arrayed waveguide, said input slab waveguide including a core layer and a clad layer;
an output slab waveguide formed between the arrayed waveguide and the output waveguides, said output slab waveguide including a core layer and a clad layer, and
two or more island regions having a refractive index different from that of the core layers of the input and output slab waveguides are provided in at least one of the slab waveguides and situated in positions associated with the channel waveguides of the arrayed waveguide;
wherein each said island region is tapered so that the width thereof decreases toward the arrayed waveguide.

4. An optical multi-demultiplexer according to claim 3, wherein the width of wider end of each said tapered island region accounts for 38% to 62% of the array pitch of the channel waveguides, the width of narrower end accounts for 0% to 26% of the array pitch of the channel waveguides, the product of the length of the island region and the relative refractive index difference ranges from 0.4 to 0.6, and the distance from the island region and the connecting end of the arrayed waveguide ranges from 100 $\mu$m to 150 $\mu$m.

5. An optical multi-demultiplexer comprising:
an input waveguide to which wavelength division multiple signals are applied;
a plurality of output waveguides for demultiplexing and outputting the wavelength division multiple signals;
an arrayed waveguide provided between the input waveguide and the output waveguides and including a plurality of channel waveguides having different waveguide lengths;
an input slab waveguide formed between the input waveguide and the arrayed waveguide, said input slab waveguide including a core layer and a clad layer and having axes extending from the input waveguide to the channel waveguides;
an output slab waveguide formed between the arrayed waveguide and the output waveguides, said output slab waveguide including a core layer and a clad layer and having axes extending from the output waveguides to the channel waveguides, and
two or more island regions having a refractive index different from that of the core layers of the input and output slab waveguides and provided in at least one of the slab waveguides and situated in positions associated with the channel waveguides of the arrayed waveguide and is an elongated one extending along one of said axes;
wherein the width of that end of each island region which faces the arrayed waveguide is 5 $\mu$m or more and is shorter than a pitch of the channel waveguides of the arrayed waveguide.

6. An optical multi-demultiplexer comprising:
an input waveguide to which wavelength division multiple signals are applied;
a plurality of output waveguides for demultiplexing and outputting the wavelength division multiple signals;
an arrayed waveguide provided between the input waveguide and the output waveguides and including a plurality of channel waveguides having different waveguide lengths;
an input slab waveguide formed between the input waveguide and the arrayed waveguide, said input slab waveguide including a core layer and a clad layer and having axes extending from the input waveguide to the channel waveguides;
an output slab waveguide formed between the arrayed waveguide and the output waveguides, said output slab waveguide including a core layer and a clad layer and having axes extending from the output waveguides to the channel waveguides, and
two or more island regions having a refractive index different from that of the core layers of the input and output slab waveguides and provided in at least one of the slab waveguides and situated in positions associated with the channel waveguides of the arrayed waveguide;
wherein the width and/or position of each said island region varies with regard to distance from the center of the slab waveguide toward the side portions of the slab waveguide and is an elongated one extending along one of said axes.

7. An optical multi-demultiplexer according to claim 6, wherein an array pitch of said island regions is different from an array pitch of said channel waveguides.

8. An optical multi-demultiplexer comprising:
an input waveguide to which wavelength division multiple signals are applied;
a plurality of output waveguides for demultiplexing and outputting the wavelength division multiple signals;
an arrayed waveguide provided between the input waveguide and the output waveguides and including a plurality of channel waveguides having different waveguide lengths;
an input slab waveguide formed between the input waveguide and the arrayed waveguide, said input slab waveguide including a core layer and a clad layer and having axes extending from the input waveguide to the channel waveguides;
an output slab waveguide formed between the arrayed waveguide and the output waveguides, said output slab waveguide including a core layer and a clad layer and having axes extending from the output waveguides to the channel waveguides, and
two or more island regions having a refractive index different from that of the core layers of the input and output slab waveguides and provided in at least one of the slab waveguides and situated in positions associated with the channel waveguides of the arrayed waveguide;
wherein there is a relation $N \times H < 40{,}000 \times (\log Q)^{-5}$, where N is the number of channels for the wavelength division multiple signals applied to the input waveguide, H (GHz) is the frequency interval, and Q is the number of channel waveguides of the arrayed waveguide and is an elongated one extending along one of said axes.

9. An optical multi-demultiplexer according to any one of claims 1, and 5–8, wherein the island regions are provided at least on the input slab waveguide and the output slab waveguides and arranged in one line which intersects with said axes.

10. An optical multi-demultiplexer comprising:

an input waveguide to which wavelength division multiple signals are applied;

a plurality of output waveguides for demultiplexing and outputting the wavelength division multiple signals;

an arrayed waveguide provided between the input waveguide and the output waveguides and including a plurality of channel waveguides having different waveguide lengths;

an input slab waveguide formed between the input waveguide and the arrayed waveguide, said input slab waveguide including a core layer and a clad layer;

an output slab waveguide formed between the arrayed waveguide and the output waveguides, said output slab waveguide including a core layer and a clad layer; and two or more island regions having a refractive index different from that of the core layers of the input and output slab waveguides, provided in at least one of the slab waveguides, and situated in positions associated with the channel waveguides of the arrayed waveguide, wherein an array pitch of said island regions is different from an array pitch of said channel waveguides, and an axis passing through the center of the island regions deviates from an axis passing through the center of the channel waveguide facing said island region.

11. An optical multi-demultiplexer according to claim 10, wherein a deviation between an axis of each island region and an axis passing between two channel waveguides that oppose said each island region is smaller than a deviation between an axis of the next outer island region and an axis passing between two channel waveguides that oppose the next outer island region.

12. An optical multi-demultiplexer comprising:

an input waveguide to which wavelength division multiple signals are applied;

a plurality of output waveguides for demultiplexing and outputting the wavelength division multiple signals;

an arrayed waveguide provided between the input waveguide and the output waveguides and including a plurality of channel waveguides having different waveguide lengths;

an input slab waveguide formed between the input waveguide and the arrayed waveguide, said input slab waveguide including a core layer and a clad layer;

an output slab waveguide formed between the arrayed waveguide and the output waveguides, said output slab waveguide including a core layer and a clad layer, and two or more island regions having a refractive index different from that of the core layers of the input and output slab waveguides are provided in at least one of the slab waveguides and situated in positions associated with the channel waveguides of the arrayed waveguide;

wherein the width and/or position of each said island region varies with regard to distance from the center of the slab waveguide toward the side portions of the slab waveguide, an array pitch of said island regions is different from an array pitch of said channel waveguides and a deviation between an axis of each island region and an axis passing between two channel waveguides that oppose said each island region is smaller than a deviation between an axis of the next outer island region and an axis passing between two channel waveguides that oppose the next outer island region.

* * * * *